US008163395B2

(12) United States Patent
Witteler et al.

(10) Patent No.: US 8,163,395 B2
(45) Date of Patent: Apr. 24, 2012

(54) METHOD FOR COATING METALS

(75) Inventors: Helmut Witteler, Wachenheim (DE);
Walter Bertkau, Ludwigshafen (DE)

(73) Assignee: BASF SE, Ludwigshafen (DE)

( * ) Notice: Subject to any disclaimer, the term of this patent is extended or adjusted under 35 U.S.C. 154(b) by 722 days.

(21) Appl. No.: 11/722,114

(22) PCT Filed: Dec. 16, 2005

(86) PCT No.: PCT/EP2005/013590
§ 371 (c)(1),
(2), (4) Date: Mar. 3, 2009

(87) PCT Pub. No.: WO2006/066824
PCT Pub. Date: Jun. 29, 2006

(65) Prior Publication Data
US 2009/0208735 A1 Aug. 20, 2009

(30) Foreign Application Priority Data
Dec. 20, 2004 (DE) .................. 10 2004 062 454

(51) Int. Cl.
*B32B 15/08* (2006.01)
*B32B 27/00* (2006.01)
(52) U.S. Cl. ........ 428/463; 427/327; 427/331; 428/336; 524/559
(58) Field of Classification Search .................. 427/327, 427/331; 428/336; 524/559
See application file for complete search history.

(56) References Cited

U.S. PATENT DOCUMENTS

| 3,084,066 A | 4/1963 | Dunmire |
| 3,443,982 A | 5/1969 | Kjellmark |
| 4,465,710 A | 8/1984 | Uchiyama et al. |
| 4,889,648 A | 12/1989 | Higaki et al. |
| 5,264,254 A | 11/1993 | Bohnacker et al. |
| 6,280,800 B1 | 8/2001 | Thiele et al. |
| 6,540,845 B1 | 4/2003 | Oyama et al. |
| 2002/0163933 A1 | 11/2002 | Benveniste |

FOREIGN PATENT DOCUMENTS

| JP | 2000285505 | * | 1/2000 |
| WO | 2004/074372 A1 | | 9/2004 |
| WO | WO-2004/074372 A1 | | 9/2004 |

OTHER PUBLICATIONS

Kunst, H. et al., "Metals, Surface Treatment", Wiley—VCH Verlag GmbH & Co. KGaA, 2005, pp. 1-43.
Klamann, D., "Lubricants and Related Products" Ullmann's Encyclopedia of Industrial Chemistry, 2000, Sixth Edition, pp. 1-9.

* cited by examiner

*Primary Examiner* — Terressa Boykin
(74) *Attorney, Agent, or Firm* — Connolly Bove Lodge & Hutz LLP

(57) ABSTRACT

Process for coating metallic surfaces with a copolymer of olefins and/or dienes, acidic monomers and, optionally, further monomers, the metal surfaces being contaminated with oil and/or grease, and the contamination not being removed prior to coating. Metallic surface obtainable by means of the process.

13 Claims, 1 Drawing Sheet

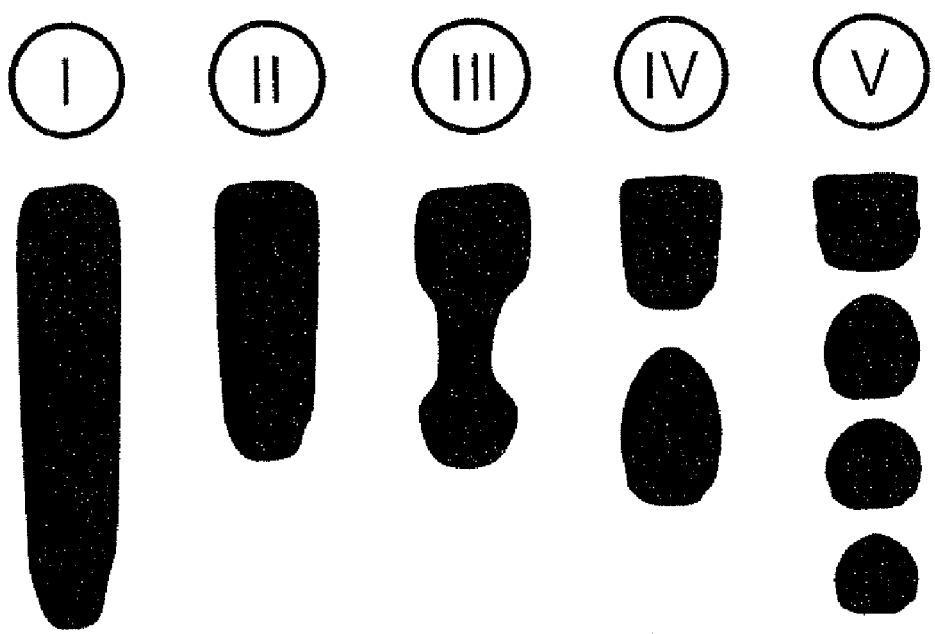

METHOD FOR COATING METALS

RELATED APPLICATIONS

This application is a national stage application (under 35 U.S.C. §371) of PCT/EP2005/013590 filed Dec. 16, 2005, which claims benefit of German application 10 2004 062 454.2 filed Dec. 20, 2004.

DESCRIPTION

The present invention relates to a process for coating metallic surfaces with a copolymer of olefins and/or dienes, acidic monomers and, optionally, further monomers, the metallic surface being contaminated with oil and/or grease and the contamination not being removed prior to coating. The invention further relates to a metallic surface obtainable by means of the process.

Metallic articles and materials, such as metal strips of steel or aluminum, for example, are frequently greased or oiled for the purpose of temporary corrosion control or of facilitating further processing steps. Examples of oils for oiling metallic surfaces are disclosed in U.S. Pat. No. 4,889,648. In the course of transit, processing or storage, moreover, such articles and materials may also become contaminated unintentionally with oils or greases.

A grease or oil layer of this kind on the surface may be to the considerable detriment of subsequent treatment steps or coating steps, such as corrosion control treatments or the application of coating films, for example. Coating adhesion, for example, may be impaired considerably. This is the case in particular if the subsequent treatment is with water-based formulations.

It is therefore customary to deoil or degrease the surface of metals before further machining steps. This degreasing or deoiling, however, is a comparatively complex operation, entailing a plurality of stages. First of all the oil or grease layer is removed in the actual cleaning step, with the aid of a cleaning bath. In many cases a degreasing process additionally comprises a precleaning step. The residues of the cleaning solutions are subsequently removed using one or more successive rinsing baths, and finally the surface is dried. The degreasing baths must be disposed of at regular intervals. For disposal, the oil accumulated in the degreasing bath is separated off from the aqueous phase in an additional workstep. Owing to the presence of surfactants in the degreasing bath, such separation necessitates additional chemicals (demulsifiers, breakers) as auxiliaries. Details on the degreasing or deoiling of metals and on formulations and apparatus required for this purpose are set out for example in "*Metals, Surface Treatment*", *Ullmann's Encyclopedia of Industrial Chemistry*, Sixth Edition, 2000, Wiley-VCH-Verlag GmbH, Weinheim Germany, Electronic Release".

Degreasing or deoiling requires a greater number of worksteps and consumes a greater amount of time and heat energy than the subsequent coating operation. It is therefore highly desirable to be able to subject even metal surfaces which have not been degreased or deoiled to further processing in a simple manner.

U.S. Pat. No. 6,540,845 discloses a process of combined degreasing and phosphatizing of a metal surface. The formulation for this purpose comprises, besides phosphate ions, nitrate ions and zinc ions, 12% to 50% by weight of organic solvents. Polymers as a constituent of the formulation are not described. The formulation itself acts as a degreasing bath, detaches oil from the metal surface, and must therefore regularly be worked up as described above. Moreover, organic solvents are frequently unwanted as a constituent of formulations.

U.S. Pat. No. 4,465,710 discloses a process for producing articles from polyurethane foams, the articles having a metallic core. In this process a metallic plate, which may also have been treated with a rust inhibitor oil, is treated first with a lubricant or release agent which contains OH groups. Each of the groups in question may be a simple alcoholic group or else part of a COOH group. By way of example the lubricant may comprise poly(meth)acrylic acid. Thereafter the metallic plate is shaped and, without further cleaning, is coated with a polyurethane-forming composition comprising polyols and isocyanates. The isocyanates also react in this case with the OH groups of the lubricant. Lubricants of this kind, however, do not afford effective inhibition of under-paint corrosion, and coating can be carried out only with isocyanate-containing formulations.

WO 04/74372 discloses the treatment, in particular the corrosion control treatment, of metal surfaces with acidic polymers which comprise at least 50% by weight of (meth)acrylic acid, at least 0.1% by weight of other acidic monomers, and not more than 30% by weight of further monomers without acidic groups.

It was an object of the invention to provide a process by which oily or greasy metal surfaces can be effectively protected from corrosion without a separate degreasing step. A further object was to make it possible for a metal surface to be coated without a separate degreasing step. Predominantly aqueous formulations were to be used for this purpose.

Accordingly, a process has been found for coating metallic surfaces, in which the surface of the metal is contacted with a copolymer, the metallic surface being contaminated with oil and/or grease, the contamination not being removed prior to coating, and where the copolymer is synthesized from the following components:
(A) 20% to 95% by weight of monoethylenically unsaturated hydrocarbons and/or hydrocarbons having two conjugated double bonds,
(B) 5% to 50% by weight of monoethylenically unsaturated monomers which contain acid groups, and/or the anhydrides or salts thereof, and
(C) 0 to 30% by weight of further ethylenically unsaturated monomers other than (A) and (B).

Also found has been a metal surface coated with a copolymer and obtainable by means of the process of the invention.

Surprisingly it has been found that by virtue of the process of the invention the metallic surface can be coated to good effect with the copolymer used in accordance with the invention. The coating has a good corrosion control action and in spite of the absence of a degreasing step adheres very well to the metallic surface.

Index to the figures:

FIG. 1: Run tracks of water droplets on a completely deoiled or degreased metal panel (I) and also on metal panels with oil contamination (II) to (V) (contamination increases from (II) to (V)).

Details of the invention are as follows:

The metallic surfaces coated by means of the process of the invention may in principle be any desired metallic surfaces. Examples comprise the surfaces of industrially customary metals and alloys such as iron, steel, galvanized steel, Zn, Al, Cu, Sn, Mg, Co or Ni.

The surfaces in question may be the surfaces of structures consisting fully of the said metals and/or alloys. Alternatively they may be structures of other materials which have only a metallic coating. The metals can be in piece form, as a mixed metal composite, as a strip or coil, or in another form.

The surface in question is preferably that of aluminum or steel, it also being possible for the steel, in a way which is known in principle, to have a coating. The coating may comprise preferably Zn, Al, Ni, Sn, Cr or alloys thereof with one another or with other metals. Steel coated with such alloys is available commercially.

In accordance with the invention the metallic surfaces are also contaminated with oil and/or grease. The nature of the contamination is unimportant here. It may involve, for example, an oil and/or grease film wholly or partly covering the surface. Another example comprises a surface contaminated with oil and/or grease droplets. It may further, for example, also involve fingerprints.

Oils and greases are, in principle, substantially water-insoluble organic compounds having a relatively low vapor pressure, whose common feature is not their chemical structure but rather their physical consistency. It is the particular advantage of the invention that it allows the coating even of surfaces covered with substantially water-insoluble oils, examples being hydrocarbon-based oils or silicone oils.

Generally speaking, a film is relatively thin; it entails at least a monomolecular layer. Typical thicknesses comprise the range from 1 nm to 0.1 mm, without any intention that the invention should be restricted to said range. An oil or grease film may cover the surface completely. The advantages of the invention, however, are also manifested if the oil and grease film only partly covers the surface while other regions of the surface are free from an oil or grease film. The skilled worker is aware that, for example, inadequate coating adhesion or inadequate corrosion control, even only in a part of the area of the surface, can adversely affect the properties of the entire workpiece. In the worst-case scenario, the entire workpiece must be considered as a reject. In general at least 10% of the surface to be treated is covered with oil and/or grease, preferably at least 25%, more preferably at least 50%, and very preferably at least 80%. The oil- and/or grease-covered regions may form a single region; alternatively, there may be a relatively large number of "islands" distributed over the surface. The latter is naturally the case with droplets, but of course may also apply to films.

The amount of adhering oil can be defined by its action—for example, by a lubricating action or a greasing action, detectable as a grease spot on paper contacted with the metal, or by its corrosion control action.

In small amounts, the precise amount and degree of coverage of the oil and/or grease cannot always be determined with simplicity without complex analytical equipment. Even small amounts of oil and/or grease, however, can be ascertained by way of the run tracks of water droplets on the surface of the metal.

FIG. 1 shows characteristic run tracks of water droplets on metal panels with different degrees of oiling. (I) is a completely deoiled and degreased panel, achievable for example by means of a surfactant-containing cleaning composition. Images (II) to (V) show typical run tracks obtained with increasing oil contamination. To produce the run tracks a water droplet is applied to a horizontal metal panel which is then raised at one side until it stands vertically.

The nature of the oil and/or grease is unimportant for performing the invention. In particular, however, it comprises oils and/or greases of the kind customary in metal processing. These may be, for example, oils and/or greases which may be applied for the purpose of (temporary) corrosion control. A further example comprises oils which are used as auxiliaries when machining metallic workpieces, such as by drilling, milling or turning, for example, or can be applied as lubricants for the processing of metals, by deep drawing or rolling, for example.

Alternatively the contamination may involve oil and/or grease which, in the course of transit, processing, storage or handling of metallic structures, may remain unintentionally on the metallic surface. Reference may be made, by way of example, to traces of grease which can remain on the metallic surface when it is handled by bare hand; in other words, by transfer of greases from the surface of the skin to the surface of the metallic material.

Examples of oils and/or greases comprise, in particular, aliphatic, naphthenic or aromatic mineral oils, silicone oils, polyalkylene glycol-based oils or fatty oils. The oil and/or grease layers may further comprise typical auxiliaries or additives. Examples comprise ionic and/or nonionic surfactants, corrosion control additives, biocides, dyes, inorganic adjuvants, molybdenum sulfide, graphite, talc, phosphates and phosphonates. The oils and/or greases may also be in the form of emulsions.

In accordance with the invention the oil- and/or grease-contaminated metallic surface for coating is contacted with a copolymer. The copolymer is synthesized at least from the two monomer units (A) and (B). Optionally, in addition, there may also be the units (C).

As component (A) use is made of 20% to 95% by weight of monoethylenically unsaturated hydrocarbons (A1) and/or hydrocarbons having two conjugated double bonds (A2), based in each case on the total amount of all monomeric units. The amount of component (A) is preferably 50% to 95%, more preferably 70% to 90%, by weight. It is of course also possible to use mixtures of different monomers (A).

The monoethylenically unsaturated hydrocarbons (A1) may be any hydrocarbons which have an ethylenically unsaturated group. These may be straight-chain or branched aliphatic and/or alicyclic hydrocarbons. They may also be hydrocarbons which besides the ethylenic group contain aromatic radicals. In general the ethylenically unsaturated hydrocarbons used have 2 to 18 carbon atoms, preferably 2 to 12 carbon atoms and more preferably 2 to 8 carbon atoms.

Examples of suitable hydrocarbons comprise ethene, propene, 1-butene, 2-butene, 1-pentene, 1-hexene, 1-heptene, 1-octene, 1-nonene, 1-decene, 1-undecene, 1-dodecene, styrene, α-methylstyrene or norbornene. Preference is given to at least one hydrocarbon selected from the group consisting of ethene, propane, 1-butene, 2-butene, 1-pentene, 1-hexene, 1-heptene and 1-octene.

The hydrocarbons having two conjugated double bonds (A2) are, in particular, butadiene, isoprene, neoprene or derivatives thereof.

With particular preference component (A) is ethene. In an additional particularly preferred embodiment of the invention (A) is a mixture of at least 50 mol % of ethene and one or more different ethylenically unsaturated hydrocarbons, the amounts here being based on the total amount of all monomers (A) that are present. This allows the skilled worker to tailor the properties of the copolymer. Preferably (A) is at least 75 mol % and more preferably at least 90 mol % of ethene. Suitable further ethylenically unsaturated hydrocarbons besides ethene include, in particular, 1-olefins such as propene, 1-butene, 1-pentene, 1-hexene, 1-heptene, 1-octene, 1-nonene, 1-decene, 1-undecene, 1-dodecene or styrene.

Component (B) comprises 5% to 50% by weight of monoethylenically unsaturated monomers which have acid groups. The acid groups may also be wholly or partly in the form of derivatives, particularly in the form of salts and/or anhydrides. The amount of component (B) is preferably 10% to 40%, more preferably 10% to 30%, by weight. It is of course also possible to use mixtures of different monomers (B).

The acidic groups may be any desired acidic group. Preferably it is at least one group selected from the group consisting of carboxyl groups, sulfonic acid groups and phosphonic acid groups.

The monomers (B) are preferably compounds having 2 to 12 carbon atoms. Examples of suitable compounds (B) comprise acrylic acid, methacrylic acid, crotonic acid, vinylacetic acid, maleic acid, fumaric acid, itaconic acid, maleic anhydride, $C_1$ to $C_4$ monoesters of monoethylenically unsaturated dicarboxylic acids, acrylamidopropylsulfonic acid, vinylsulfonic acid, allylsulfonic acid or vinylphosphonic acid. Preferably (B) comprises acrylic acid and methacrylic acid, particular preference being given to methacyrlic acid.

In accordance with the invention the sum of the amounts of (A) and (B) is at least 70% by weight, based in each case on the total amount of all components of the copolymer. Besides monomers (A) and (B) it is also possible, optionally, to use up to 30% by weight of further monomers (C). Monomers of this kind can be used by the skilled worker to fine-tune the properties of the copolymer employed. These may in principle be any desired comonomers (C). The selection is limited only insofar as the comonomers must be able to be copolymerized with components (A) and (B) by means of the chosen copolymerization technology. The skilled person will make an appropriate selection in accordance with the desired properties of the copolymer.

Component (C), present optionally, comprises ethylenically unsaturated monomers different from (A) and/or (B). It is of course also possible to use mixtures of different comonomers (C). Examples of suitable monomers (C) comprise, in particular, derivatives of ethylenically unsaturated carboxylic acids. Examples comprise straight-chain or branched alkyl esters of (meth)acrylic acid, such as methyl (meth)acrylate, ethyl (meth)acrylate, butyl (meth)acrylate or 2-ethylhexyl (meth)acrylate, and additionally (meth)acrylamide, alkyl (meth)acrylamides or vinyl acetate.

The comonomers (C) may also be monomers which have a crosslinking action, or crosslinking monomers. Crosslinking monomers contain two or more isolated, ethylenically unsaturated groups. Examples of suitable crosslinkers comprise (meth)acrylates of dihydric or polyhydric, preferably aliphatic, alcohols, such as ethylene glycol di(meth)acrylate, butanediol di(meth)acrylate or hexanediol di(meth)acylate. The nature and amount of the crosslinker are selected by the skilled worker in accordance with the nature of the desired properties of the copolymer. Too high a degree of crosslinking, however, ought to be avoided.

The comonomers (C) are used in an amount of 0 to 30% by weight, preferably 0 to 20% by weight and more preferably 0 to 10% by weight. The amount of crosslinking comonomers should not in general exceed 5%, preferably 3%, by weight. The amounts are based in each case on the total amount of all monomers (A), (B) and (C) employed. Components (A), (B) and, optionally, (C) can be polymerized with one another in a manner which is known in principle. Corresponding polymerization techniques are known to the skilled worker. The copolymers are preferably prepared by free-radical copolymerization of the aforementioned components (A), (B) and, optionally, (C). The proportions of the components employed have already been specified above. The free-radical copolymerization can take place, for example, in solution, emulsion, dispersion, suspension or bulk (without solvent). The polymerization can take place preferably in solution.

Particularly preferred for use in the process of the invention are copolymers of ethene with comonomers from the group consisting of acrylic acid, methacrylic acid, maleic acid and maleic anhydride, comprising 50% to 95% by weight, preferably 70% to 90% by weight, of ethene.

In a further, preferred embodiment of the invention some of the acid functions present in the copolymer are in neutralized form. Suitable bases for neutralizing include, in particular, ammonia, amines, amino alcohols or suitable metal compounds, examples being hydroxides, oxides or carbonates. Preferred metal cations as counterions are $Na^+$, $K^+$, $Ca^{2+}$, $Sr^{2+}$, $Mg^{2+}$, Ce(III), Ni, Mn(II), Cr(III), Fe(II), Fe(III), Co(II), Co(III) and Al(III). Preferred amines are alkylamines having up to 24 carbon atoms, and also amino alcohols which have up to 24 carbon atoms and contain structural units of the type $-N-C_2H_4-O-$ and $-N-C_2H_4-OH$ and $N-C_2H_4-O-CH_3$. Examples of such amino alcohols comprise ethanolamine, diethanolamine, triethanolamine and their methylated derivatives.

Preferably 0.5 mol % to 50 mol % of the acid groups present in the copolymer are in neutralized form, more preferably 1 to 40 mol % and very preferably 2 to 30 mol %.

For the coating process of the invention the surface of the metal is contacted with the copolymer. Mixtures of two or more different copolymers may also be used, of course.

For this purpose the copolymer may be used without solvent and may be applied, for example, by means of powder coating. The formulation of the powder coating may optionally comprise typical auxiliaries and/or additives.

Preferably, for the purpose of coating, the copolymer used in accordance with the invention is used as a formulation in a suitable solvent or mixture of different solvents. Preferably only water is used as solvent. Further components of a mixture comprise, in particular, water-miscible solvents. Examples comprise monoalcohols such as methanol, ethanol or propanol, higher alcohols such as ethylene glycol or polyether polyols and ether alcohols such as butyl glycol and methoxypropanol. A preferred mixture with organic solvents comprises at least 75%, more preferably at least 85% and very preferably at least 95% by weight of water. The amounts are based in each case on the total amount of all solvents.

The copolymer may be in solution or dispersion in the solvent mixture. Preference is given to a dispersion of the copolymer. The concentration of the copolymer is generally 0.1% to 50%, preferably 1% to 30% and more preferably 3% to 15% by weight. These amounts are based on the sum of all components of the formulation. With preference the copolymer is formulated only in water and the concentration of the copolymer amounts to 0.5% to 50% by weight.

Beyond the stated components the formulation may further comprise additional components. These, for example, can be organic or inorganic acids. Further optional components comprise surface-active compounds, corrosion inhibitors, typical electroplating auxiliaries, or else other polymers different from the polymers of the invention.

Polymers different from the polymers of the invention may be used to fine-tune the properties of the coat. In this context it is possible in particular to use polymers containing acidic groups, and especially polymers comprising COOH groups. Examples of such polymers comprise polyacrylic acids of various molecular weights, or else copolymers of acrylic acid and other acidic monomers. The amount of such secondary polymers should generally not exceed 50% by weight, based on the amount of all polymers used. Preferably their amount is 0 to 30%, more preferably 0 to 20% and very preferably 0 to 10% by weight.

The skilled worker makes an appropriate selection from the optional components that are possible in principle, and also their amounts, in accordance with the desired application.

For coating, the surface of the metal is contacted with the preparation, by means for example of spraying, squirting, dipping, brushing or electrophoretic coating.

Following a dipping preparation it is possible to allow the workpiece to drip dry in order to remove excess formulation; in the case of metal sheets, metal foils or the like, however, excess formulation can also be removed by squeezing or squeegeeing. In the course of the treatment, parts at least of the polymer used, and further components of the formulation if appropriate, are chemisorbed by the surface of the metal and/or react with the surface, so producing a firm bond between surface and components. Coating with the formulation takes place in general at room temperature (15 to 45° C.), without an intention thereby to rule out higher temperatures in principle. As a general rule, coating takes place at 20 to 90° C., preferably 25 to 80° C. and more preferably 30 to 60° C. For this purpose the bath with the formulation can be heated, although an elevated temperature may also come about automatically, by the immersion of hot metal into the bath.

The coating may also involve what is called a "no-rinse" operation, where the formulation, immediately following its application, is dried directly in a drying oven, without rinsing. An alternative possibility is to rinse the surface after treatment with a cleaning liquid, in particular with water, in order to remove residues of the formulation employed from the surface.

The process of the invention can take place discontinuously or, preferably, continuously. In the case of a discontinuous process the process may be a dipping process for piece goods, for example, in which the piece may be hung up on racks or may be present as loose product in perforated drums. A continuous process is particularly suitable for treating strip or coil metals. In this case the metal strip or coil is run through a trough or a spraying apparatus with the preparation, and optionally through further pretreatment or aftertreatment stations. A degreasing station such as is present in conventional processes is unnecessary.

The period of treatment with the formulation is determined by the skilled worker in accordance with the desired properties of the coat, of the formulation used for the treatment, and with the technical boundary conditions. It may be significantly less than one second or several minutes. In the case of the continuous process it has been found particularly appropriate to contact the surface with the preparation for a period of 1 to 60 s.

Following the treatment the solvent used is removed. Removal may take place at room temperature by simple evaporation in air at room temperature.

Alternatively, the removal of the solvent may be assisted by suitable auxiliary means: for example, by heating and/or by overpulsing gas streams, especially air streams, such as by drying in a drying tunnel, for example. The evaporation of the solvent may also be assisted by IR lamps. Temperatures which have proven appropriate for drying are from 40° C. to 160° C., preferably 50° C. to 150° C. and more preferably 70° C. to 130° C. This refers to the temperature on the metal surface; it is necessary if appropriate to set the temperature of the drier at a higher level, and this temperature is chosen appropriately by the skilled worker.

A metal surface coated with the copolymer outlined above is obtainable by means of the process of the invention. The coating is applied directly to the metal surface and comprises the copolymer used in accordance with the invention, optionally further components, and also oils and greases with which the surface was coated. These oils and/or greases may be distributed preferably homogeneously in the copolymer coat, but may also form aggregates in said coat, as a result of microphase separation, for example.

The thickness of the coating is set by the skilled worker in accordance with the desired properties of the coat. As a general rule the thickness is 0.1 to 20 μm, preferably 0.5 to 5 μm. The thickness can be influenced, for example, by way of the nature and amount of the components applied and also by way of the exposure time. It is preferred to adjust the coat thickness via the concentration of the copolymer in the aqueous formulation used for coating. It can also be influenced by technical parameters of the process, such as by removing excessive applied treatment solution by means of squeegees or rollers, for example.

The metallic surface with the coating of the invention may be provided by a manner known in principle with one or more further coating films applied one atop another. These may be, for example, color or effect coating films. Typical coating materials, their composition, and typical coat sequences in the event of two or more coating films are known in principle to the skilled worker. It is a particular advantage of the invention that the coating applied in accordance with the invention lends itself well to overcoating with commercially customary coating materials.

The examples which follow are intended to illustrate the invention in more detail:

Provision of a Metal Surface with Oil Layer

For the purpose of controlled application of an oil film, aluminum panels (aluminum AlMg1) were immersed in oil and then rinsed off with hot water (50° C., 1 min). A thin layer of oil remained on the panel.

The oil used was paraffin oil or silicone oil. For comparison purposes, one panel was conventionally degreased/deoiled.

The difference between the differently treated panels in respect of the degree of contamination with oil can be determined by the run tracks of water droplets. Typical run tracks are shown—as already elucidated above—in FIG. 1. The treated panels with an oil layer exhibit the run track (V), the deoiled panel the run track (I).

Coatings with Inventive Copolymer

For the coating tests an aqueous dispersion of a copolymer made of 74% by weight ethylene and 26% by weight methacrylic acid was used. Additionally an aqueous dispersion of a copolymer made of 80% by weight ethylene and 20% by weight methacrylic acid was used. The concentration of the copolymer had the value indicated in Table 1 and the COOH groups were partly neutralized with diethanolamine. The pH of the dispersion was approximately 9.

Coating took place by immersing the panels in the aqueous dispersion (duration: 5 s). Following immersion, the panels were dried at 120° C.

For comparison purposes, one panel was treated with a commercially customary primer (Glasurit® PKW-Grundfüller [automotive primer-surfacer] VDC 283-150+Zusatzlösung [additive solution] 352-228, both products of BASF Coatings AG, Münster, Germany. The components are mixed 2/1).

Further comparison panels were treated with a noninventive copolymer made of styrene (50% by weight), n-butyl acrylate (47% by weight) and acrylic acid (3% by weight).

After drying the panels are coated with a commercially customary topcoat (2 parts Glasurit® HS-2K-22-RAL 9010 white+1 part Härter [hardener] 929-93+10% by volume Einzelzusatz [individual additive] 352-91 from BASF Coatings AG, Münster, Germany). The topcoat is applied by knifecoating with a 50 μm knife at a rate of 12.5 mm/sec and is dried at RT.

Corrosion Control Testing and Adhesion Testing

For testing in the salt spray chamber the panels are scored with a standard 1 mm scribe mark and the salt spray test of DIN 50021 is carried out. Subfilm corrosion is described with the subfilm corrosion number $r=(c-0.5)/2$, where $c$=the extent of subfilm corrosion on both sides in mm.

The adhesion is tested in accordance with DIN EN ISO 2409 and evaluated with characteristic cross-cut values, where "0" denotes a very good evaluation and "5" a very poor evaluation.

The results of the inventive and comparative examples are reported in Table 1.

TABLE 1

Results of the inventive and comparative experiments

| | Type of oil | Degreasing | Coating Primer | Topcoat | Cross-cut evaluation | Subfilm corrosion, r, after 24 h salt spray test |
|---|---|---|---|---|---|---|
| Comparative Example 1 | Paraffin oil | no | none | yes | 5 | >25 |
| Comparative Example 2 | Paraffin oil | no | commercial primer | yes | 5 | >25 |
| Comparative Example 3 | Paraffin oil | yes | none | yes | 5 | >25 |
| Comparative Example 4 | Paraffin oil | no | copolymer of styrene, n-butyl acrylate and acrylic acid (50/47/3) | yes | 5 | >25 |
| Inventive Example 1 | Paraffin oil | no | ethylene/MAA copolymer, 10% in water | yes | 1 | 0 |
| Inventive Example 2 | Paraffin oil | no | ethylene/AA copolymer, 10% in water | yes | 1 | 0 |
| Inventive Example 3 | Silicone oil | no | ethylene/MAA copolymer, 10% in water | yes | 1 | 0.5 |

The inventive and comparative experiments show that by means of the process of the invention even surfaces of metals which have not be degreased or deoiled can be coated. The coating of the invention imparts outstanding adhesion for a subsequent topcoat film. At the same time a very good corrosion control action is obtained as well.

When other polymers are used, which although comprising the required amount of hydrocarbon monomers comprise less than 5% of monomers containing acidic groups, no satisfactory results are achieved. The adhesion to surfaces which have not bee deoiled is inadequate.

By means of the process of the invention it is possible to reduce the number of required process steps in the coating of metals having oil and grease layers in comparison with the prior art Table 2 below compares by way of example the number of treatment steps in state of the art processes with the process of the invention, using dipping as an example.

TABLE 2

Comparison of the invention with the state of the art

| State of the art coating of steel without phosphatizing | State of the art coating of aluminum | Inventive process (Method 1) | Inventive process (Method 2) |
|---|---|---|---|
| 1. Degreasing | 1. Degreasing | 1. Dipping in copolymer | 1. Dipping in copolymer |
| 2. Rinsing | 2. Rinsing | | |
| 3. Drying | 3. Chromate-containing pretreatment | formulation 2. Drying | formulation 2. Drying |
| 4. Primer | | | 3. Topcoat |
| 5. Drying | 4. Rinsing 1 | | 4. Drying |
| 6. Topcoat | | | |
| 7. Drying | 5. Rinsing 2 | | |
| | 6. Drying | | |
| | 7. Primer | | |
| | 8. Drying | | |
| | 9. Topcoat | | |
| | 10. Drying | | |

The invention claimed is:

1. A process for coating a metallic surface contaminated with oil and/or grease comprising the step of contacting said metallic surface with a coating comprising a copolymer synthesized from:
   (A) 20% to 95% by weight of monoethylenically unsaturated hydrocarbons and/or hydrocarbons having two conjugated double bonds;
   (B) 5% to 50% by weight of monoethylenically unsaturated monomers which contain acid groups, and/or the anhydrides or salts thereof; and
   (C) 0 to 30% by weight of further ethylenically unsaturated monomers different from (A) and (B); and
   wherein said contamination is not removed prior to coating.

2. The process according to claim 1, wherein (A) comprises at least one alkene selected from the group consisting of ethene, propene, 1-butene, 2-butene, 1-pentene, 1-hexene, 1-heptene, and 1-octene.

3. The process according to claim 1, wherein said acid group is at least one group selected from the group consisting of carboxyl groups, sulfonic acid groups, and phosphonic acid groups.

4. The process according to claim 3, wherein (A) is ethene and (B) is (meth)acrylic acid.

5. The process according to claim 1, wherein 0.5 to 50 mol % of the acid groups present in said copolymer are in neutralized form.

6. The process according to claim 1, wherein said copolymer is in the form of a formulation with water or with an aqueous solvent mixture comprising at least 75% by weight of water.

7. The process according to claim 6, wherein said copolymer is formulated only in water and the concentration of said copolymer is from 0.5 to 50% by weight, based on the sum of all components of the formulation.

8. The process according to claim 1, wherein said copolymer is applied by powder coating.

9. The process according to claim 6, wherein said copolymer is applied by spraying, squirting, dipping, brushing, or electrophoretic coating.

10. The process according to claim 1, wherein said metallic surface comprises a metal selected from the group consisting of aluminum, steel, steel coated with Zn, Al, Ni, Sn, Cr, and alloys thereof.

11. A coated metallic surface coated according to the process of claim 1.

12. The coated metallic surface according to claim 11, wherein the thickness of said coating is 0.1 to 20 µm.

13. The coated metallic surface according to claim 11, wherein one or more additional coating films are applied over the coating comprising said copolymer.

* * * * *